(12) United States Patent
Pollack et al.

(10) Patent No.: US 7,869,397 B2
(45) Date of Patent: Jan. 11, 2011

(54) MEDIUM ACCESS CONTROL PROTOCOL FOR OFDM WIRELESS NETWORKS

(75) Inventors: Michael A. Pollack, Cupertino, CA (US); Vincent K. Jones, Redwood Shores, CA (US); Gregory G. Raleigh, El Granada, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 12/467,163

(22) Filed: May 15, 2009

(65) Prior Publication Data

US 2009/0225703 A1 Sep. 10, 2009

Related U.S. Application Data

(63) Continuation of application No. 11/221,430, filed on Sep. 8, 2005, now Pat. No. 7,551,578, which is a continuation of application No. 09/738,061, filed on Dec. 15, 2000, now Pat. No. 7,020,069, which is a continuation of application No. 09/019,938, filed on Feb. 6, 1998, now Pat. No. 6,192,026.

(51) Int. Cl.
*H04W 4/00* (2009.01)
(52) U.S. Cl. ...................................... 370/328
(58) Field of Classification Search ................. 370/208, 370/203, 329, 328, 343, 344, 348, 484, 322, 370/210, 493, 494; 375/360, 222
See application file for complete search history.

(56) References Cited

U.S. PATENT DOCUMENTS

| | | | |
|---|---|---|---|
| 5,282,222 A | 1/1994 | Fattouche et al. | |
| 5,444,697 A * | 8/1995 | Leung et al. | 370/207 |
| 5,537,414 A | 7/1996 | Takiyasu et al. | |
| 5,640,395 A | 6/1997 | Hamalainen et al. | |
| 5,732,113 A | 3/1998 | Schmidl et al. | |
| 5,802,044 A | 9/1998 | Baum et al. | |
| 5,859,959 A | 1/1999 | Kimball et al. | |
| 5,943,604 A * | 8/1999 | Chen et al. | 455/3.06 |
| 6,005,840 A | 12/1999 | Awater et al. | |

(Continued)

OTHER PUBLICATIONS

N. Abramson, "The Aloha System—Another Alternative for Computer Communications*," 1970 Fall Joint Computer Conference, AFIPS Conference Proceedings, AFIPS Press, Montvale, NJ, vol. 37, pp. 281-285 (1970).

(Continued)

*Primary Examiner*—Chi H Pham
*Assistant Examiner*—Alexander Boakye

(57) ABSTRACT

A medium access contention protocol that is highly beneficial in wireless networks and particularly in wireless networks that employ a fixed minimum burst size such as OFDM wireless networks. In one embodiment, a MAC protocol is a demand-assigned protocol that maximizes utilization of the bus medium (the allocated frequency spectrum.) Each data communication device (DCD) in the network communicates with a central access point (AP). Multiple DCDs may request access from the AP in the same request access (RA) burst. Each of the multiple DCDs transmits its access request to the AP within a frequency domain channel in the RA burst that is orthogonal to the frequency domain channels used by the other DCDs requesting access. Each DCD includes channel training information in the access request burst to allow the AP and/or DCD to adapt to rapid variations in channel characteristics.

18 Claims, 8 Drawing Sheets

U.S. PATENT DOCUMENTS

| | | | |
|---|---|---|---|
| 6,091,932 A * | 7/2000 | Langlais | 725/111 |
| 6,192,026 B1 | 2/2001 | Pollack et al. | |
| 7,020,069 B1 | 3/2006 | Pollack et al. | |
| 7,551,578 B2 | 6/2009 | Pollack et al. | |

OTHER PUBLICATIONS

M. Karol et al., "An Efficient Demand-assignment Multiple Access Protocol for Wireless Packet (ATM) Networks," ACM/Baltzer Wireless Networks, vol. 1, No. 3, pp. 267-279 (1995).

A. Acampora, "An Introduction to Broadband Networks," Plenum Press, New York, NY, pp. 53-55 (1994).

K. Jacobsen et al., "A Discrete Multitone-based Network Protocol for Multipoint-to-point Digital Communications in the CATV Reverse Channel," In 1995 Canadian Cable Television Association (CCTA) Technical Papers, pp. 121-139 (May 1995).

A. Peled et al., "Frequency Domain Data Transmission Using Reduced Computational complexity Algorithms," IEEE International Conference on Acoustics, Speech and Signal Processing—Apr. 9-11, 1980, Fairmont Hotel, Denver, CO., vol. 1 of 3, pp. 964-967 (Apr. 1990).

M. Karol et al., "An Efficient Demand-assignment Multiple Access Protocol for Wireless Packet (ATM) Networks," Baltzer Journals (Jul. 1995).

C. Ostberg et al., "Multiaccess Methods Based on OFDM," Telia Research AB, Communication System, Aurorum 6 S-977, Lulea, Sweden, pp. 1-3.

* cited by examiner

MEDIUM ACCESS CONTROL PROTOCOL FOR OFDM WIRELESS NETWORKS

CROSS-REFERENCE TO RELATED APPLICATIONS

The present application is a continuation of co-assigned U.S. patent application Ser. No. 11/221,430 filed 8 Sep. 2005 now U.S. Pat. No. 7,551,578, titled MEDIUM ACCESS CONTROL PROTOCOL FOR OFDM WIRELESS NETWORKS. U.S. patent application Ser. No. 11/221,430 is in turn a continuation of co-assigned U.S. patent application Ser. No. 09/738,061 filed Dec. 15, 2000, titled MEDIUM ACCESS CONTROL PROTOCOL FOR OFDM WIRELESS NETWORKS, now U.S. Pat. No. 7,020,069. U.S. patent application Ser. No. 09/738,061 is in turn a continuation of co-assigned U.S. patent application Ser. No. 09/019,938 filed Feb. 6, 1998, also titled MEDIUM ACCESS CONTROL PROTOCOL FOR OFDM WIRELESS NETWORKS, now U.S. Pat. No. 6,192,026. The contents of each of U.S. patent application Ser. Nos. 11/221,430, 09/738,061 and 09/019,938 are incorporated herein by reference.

The present application is related to the subject matter of a co-assigned application titled SPATIO-TEMPORAL PROCESSING FOR COMMUNICATION, U.S. patent application Ser. No. 08/921,633 filed on Aug. 27, 1997, now U.S. Pat. No. 6,144,711, the contents of which are herein incorporated by reference.

BACKGROUND OF THE INVENTION

The present invention relates to communication network protocols for medium access. In particular, the present invention relates to communication network protocols in the context of a wireless medium and in the context of communication networks that utilize fixed minimum packet sizes.

Data communications devices (DCDs) on certain common types of network must share the communication medium. The function of a medium access control (MAC) protocol is to allow each DCD the opportunity to seize the medium to transmit its data according to the rules of the protocol. In order to facilitate effective data communications, the opportunities to transmit should occur such that the wait time between opportunities is not excessive. In addition, access to the medium should be distributed fairly among the DCDs. A number of MAC protocols have been developed and fielded in wired networks.

These protocols include ALOHA, slotted-ALOHA, CSMA, and CSMA-CD. The ALOHA system is described in N. Abramson, "The ALOHA System—Another Alternative for Computer Communications," 1970 Fall Joint Computer Conference, AFIPS Conference Proceedings, Vol. 37, AFIPS Press, Montvale N.J., 1970, the contents of which are herein incorporated by reference. CSMA and CSMA-CD systems are described in Anthony S. Acampora, "An Introduction to Broadband Networks," Plenum Press, New York, N.Y., 1994, the contents of which are herein incorporated by reference.

ALOHA and slotted-ALOHA are random access schemes that could be adapted fairly easily to wireless networks. However, these MAC protocols suffer from poor maximum bus utilization.

While CSMA and CSMA-CD exhibit much better bus utilization, these protocols are much better suited to wired networks than wireless for the following reason: The operation of both CSMA and CSMA-CD depend upon each DCD in the network being able to sense when any of the other DCDs is transmitting. A DCD only transmits when it has determined that the bus is not currently in use by another DCD. This requirement becomes problematic in a wireless network since it often occurs that not every DCD in the network is within range of all the others.

FIG. 1 depicts a simple wireless network 100 with 3 DCDs 102. B communicates with both A and C. A and C are separated by too large a distance to detect when the other is transmitting, and are therefore obviously unable to communicate directly. To illustrate the problem that can arise, suppose A is transmitting to B. Since C cannot detect A's transmissions, it will mistakenly assume that the medium is not being used. Then, suppose that C, mistakenly believing that the bus is idle, attempts to transmit a message to B. As a result, a data collision occurs at B and the messages transmitted by both A and C are corrupted or one of the messages is lost. A situation such as this is commonly referred to as the "hidden terminal problem."

FIG. 2 depicts a solution to the hidden terminal problem. A wireless network 200 includes several DCDs 202 and a specialized central DCD 204, also referred to as an access point (AP) 204. Each DCD 202 communicates through AP 204. AP 204 allocates the use of the medium by all DCDs 202 making up the network. In order to be integrated into the network configuration, any remote DCD 202 must be within the coverage area of AP 204. This ensures that DCD 202 is able to receive, and will therefore adhere to, the commands issued by AP 204 concerning use of the medium.

MAC protocols using this network architecture have been implemented for cellular communication systems, wherein the base stations serve as APs and the cellular phones serve as the DCDs. However, because the nature of voice traffic is quasi-continuous and relatively low bandwidth, cellular MAC protocols are designed with circuit-switched channel assignments. The available spectrum is divided into frequency channels and/or time slots and/or spread spectrum spreading code channels that are assigned to a user for the duration of a call, regardless of whether there is any voice activity. This type of MAC protocol is inefficient in a typical computer or multi-media network due to the inherently bursty nature of its traffic. Exchanging bursty traffic over a circuit-switched network results in the circuit-switched connections frequently sitting idle.

With a demand-assigned protocol, usage of the bus is allocated dynamically by a bus arbiter according to the traffic demands of each DCD on the network. One example of a demand assigned MAC protocol is DQRUMA which is described in Mark J. Karol, Zhao Liu, and Kai Y. Eng, "An Efficient Demand-Assignment Multiple Access Protocol for Wireless Packet Networks". ACM/Baltzer Wireless Networks, Vol. 1, No. 3, pp. 267-279, 1995, the contents of which are herein incorporated by reference. Under this protocol, each DCD that has data to transmit notifies the AP. Any DCDs needing to use the bus submit their requests during a predefined, regularly reoccurring, time period called the request access (RA) slot. Whenever more than one DCD submits a request during the predefined period, all those requests are lost in a collision. In effect, the access request process operates like a slotted-ALOHA system, i.e., time-aligned random-access transmissions.

Upon receiving a valid access request, the AP sends back an acknowledgement message, and places the terminal's ID in a queue with other DCDs whose access requests were received but that have not yet been able to complete their transmissions. The AP manages the queue according to any one of many possible assignment algorithms. The AP notifies a given DCD shortly before its turn to use the bus. The DCD then uses the bus for a fixed, and reasonably short, period of time. If the DCD hasn't finished transmitting all of its data at the end of its allotted bus access period, it tacks a "piggyback request" onto the end of its transmission. The piggyback request lets the AP know that the DCD that just finished transmitting needs the bus again. This is equivalent to submitting a contention-free access request, helping to complete transfers which have already started. In addition, the piggyback request scheme significantly reduces the number of DCDs contending for access in the RA slot.

A demand-assigned protocol such as DQRUMA possesses many desirable features for a wireless data network as has just been described. However, it also possesses several undesirable qualities making it difficult to implement on many wireless networks. For instance, DQRUMA assumes the existence of simultaneous parallel uplink (traffic going into the AP) and downlink (traffic coming out of the AP) channels between the AP and the DCDs. If the parallel channels each have equal capacity, the bus can only operate at maximum efficiency when traffic into and out of the AP is perfectly balanced between uplink and downlink. Whenever the traffic is not balanced, one of the channels must operate below capacity. It is difficult, if not impossible, to reallocate bandwidth between the uplink and downlink channels in response to varying loads.

The only practical way to obtain two simultaneous channels in a wireless system is through frequency division duplexing (FDD), i.e., uplink traffic resides on one carrier frequency and downlink traffic resides on another. Often, frequency spectrum allocations for a given application do not lend themselves to the implementation of FDD systems. Unless the uplink and downlink frequency bands can be separated (into non-contiguous blocks) the analog filtering (diplexer) requirements for the wireless transceiver become extremely difficult if one is to avoid wasting a large portion of the spectrum.

In DQRUMA, requests for access to the bus, and the acknowledgements of those requests, are relatively short messages. The DQRUMA protocol is designed to use short requests and acknowledgement messages and longer data packets. However, in certain systems, such as networks that employ OFDM (Orthogonal Frequency Division Multiplexing), it is difficult to vary the size of the message bursts. Unless the data bursts in the system are very small, using the same size bursts to transmit access requests and acknowledgements will result in a many unused data bit in those bursts, adversely impacting spectral efficiency.

Furthermore, once a DCD has received an acknowledgement of its access request, it must continually listen to messages from the AP as it waits its turn to use the bus. This is a significant disadvantage for portable wireless DCDs, where battery life is a major consideration.

A medium access protocol for wired networks has been proposed in which multiple DCDs transmit overlapping messages during a single OFDM burst in such a way that the AP correctly receives each of the individual messages. See K. S. Jacobsen, J. A. C. Bingham, and J. M. Cioffi, "A Discrete Multitone-based Network Protocol for Multipoint-to-point Digital Communications in the CATV Reverse Channel," in 1995 Canadian Cable Television Association (CCTA) Technical Papers, May 1995, the contents of which are herein incorporated by reference. However, for this method to work properly, the AP must have knowledge of the channel between itself and each DCD transmitting the message. To obtain this channel knowledge, a separate channel training routine is executed, with the AP storing the channel measurements for later use. This is a workable solution for the time invariant (or very slowly varying) cable television channels contemplated by Jacobsen, et al.

However, in a wireless network the channel changes so rapidly that each message transmitted by a DCD propagates through an essentially unknown channel before reaching the AP. The Jacobsen, et al. method is thus unusable in the wireless context.

What is needed is a MAC protocol that efficiently accommodates fixed minimum packet sizes in a wireless contexts and that furthermore allows the DCD to deactivate its idle circuitry during bursts in which it neither transmits nor receives.

SUMMARY OF THE INVENTION

The present invention provides a medium access contention protocol that is highly beneficial in wireless networks and particularly in wireless networks that employ a fixed minimum burst size such as OFDM wireless networks. In one embodiment, a MAC protocol according to the present invention is a demand-assigned protocol that maximizes utilization of the bus medium (the allocated frequency spectrum.) Each data communication device (DCD) in the network communicates with a central access point (AP). The AP is responsible for assigning usage of the bus.

Multiple DCDs may request access from the AP in the same request access (RA) burst. Each of the multiple DCDs transmits its access request to the AP within a channel in the RA burst that does not interfere with other channels used by the other DCDs requesting access. Each DCD includes channel training information in the access request burst to allow the AP and/or DCD to adapt to rapid variations in channel characteristics. Once the AP has determined and distributed a schedule for access requests, individual DCDs may idle themselves during periods when they are scheduled for either transmission or reception.

A first aspect of the present invention provides a method for sharing access to a common wireless medium in a wireless communication system. The method includes a step of transmitting an access request burst from a plurality of data communication devices to a central access point. The access request burst is divided into a plurality of OFDM tones. Each one of the plurality of data communications devices transmits using only a subgroup of the plurality of OFDM tones. The method further includes a step of receiving the access request burst at the central access point. In response to receipt of the access request burst at the central access point, the plurality of data communication devices are scheduled for access to the common wireless medium.

A second aspect of the present invention provides a method for operating a wireless local area network. The method includes steps of defining a burst length for communication, and transmitting bursts having the fixed burst length from a plurality of data communication devices coupled to the wireless local area network. The bursts include bursts carrying data and bursts carrying access request information.

A further understanding of the nature and advantages of the inventions herein may be realized by reference to the remaining portions of the specification and the attached drawings.

DESCRIPTION OF SPECIFIC EMBODIMENTS

Exemplary Wireless System

Figure 1:
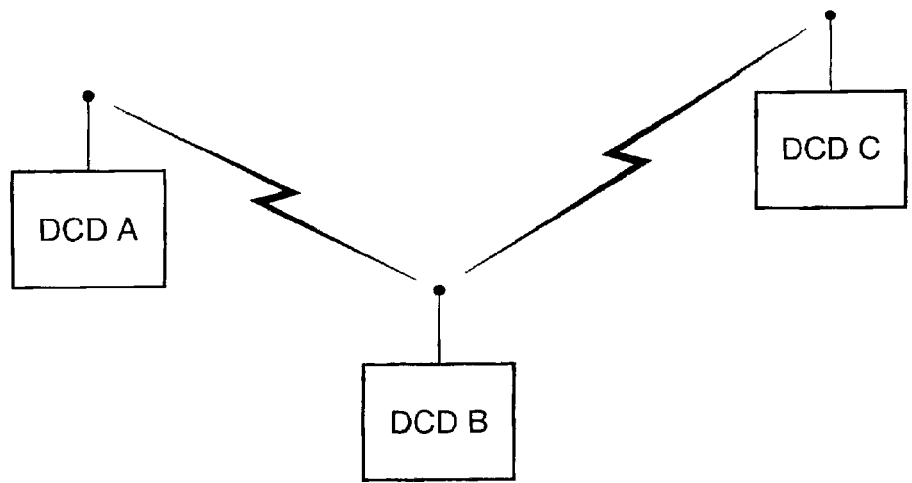
FIG. 1 depicts a prior art wireless network of data communication devices.
Figure 2:
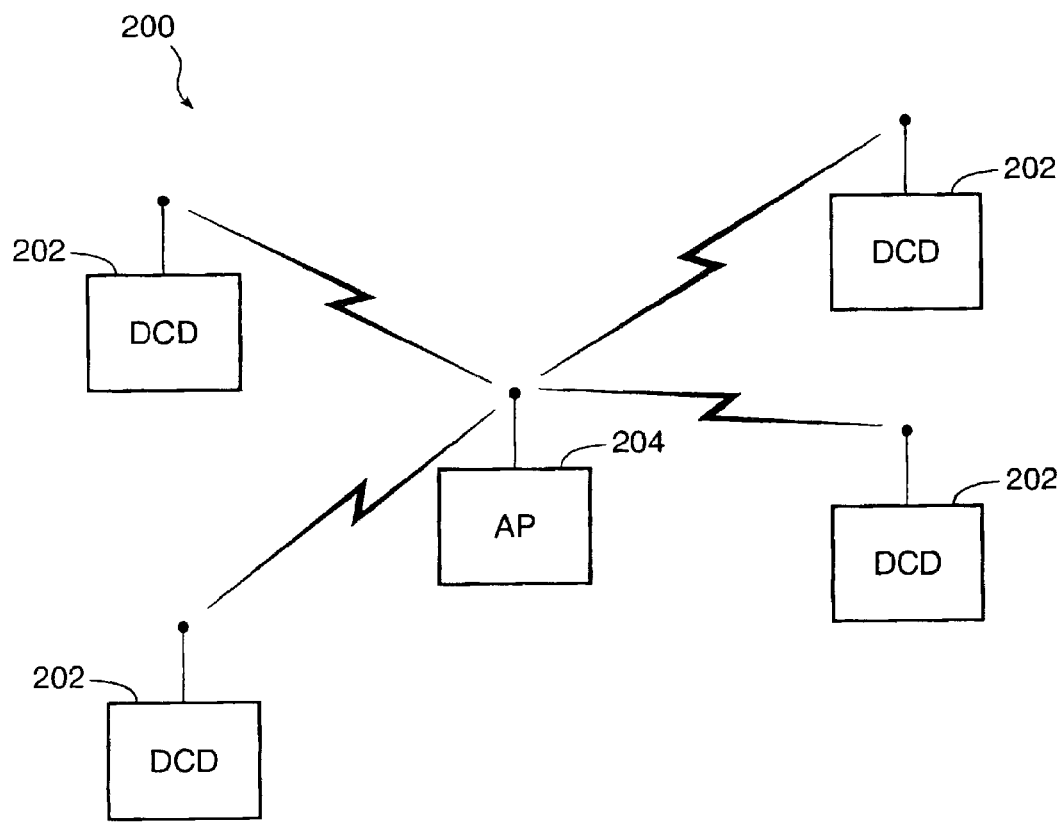
FIG. 2 depicts a wireless network of data communication devices and a central access point that may be operated in accordance with one embodiment of the present invention.

The explanation of the present invention will assume an exemplary wireless system. Like the system depicted in FIG. 2, the exemplary wireless system includes access point 204 and multiple data communication devices 202. Data communication devices (DCDs) 202 and access point (AP) 204 each employ a orthogonal frequency division multiplexed (OFDM), radio modem to receive and transmit over the network medium. The shared network medium, also referred to as "the bus", is, in this case, the frequency spectrum allocated for the wireless network.

Figure 3:
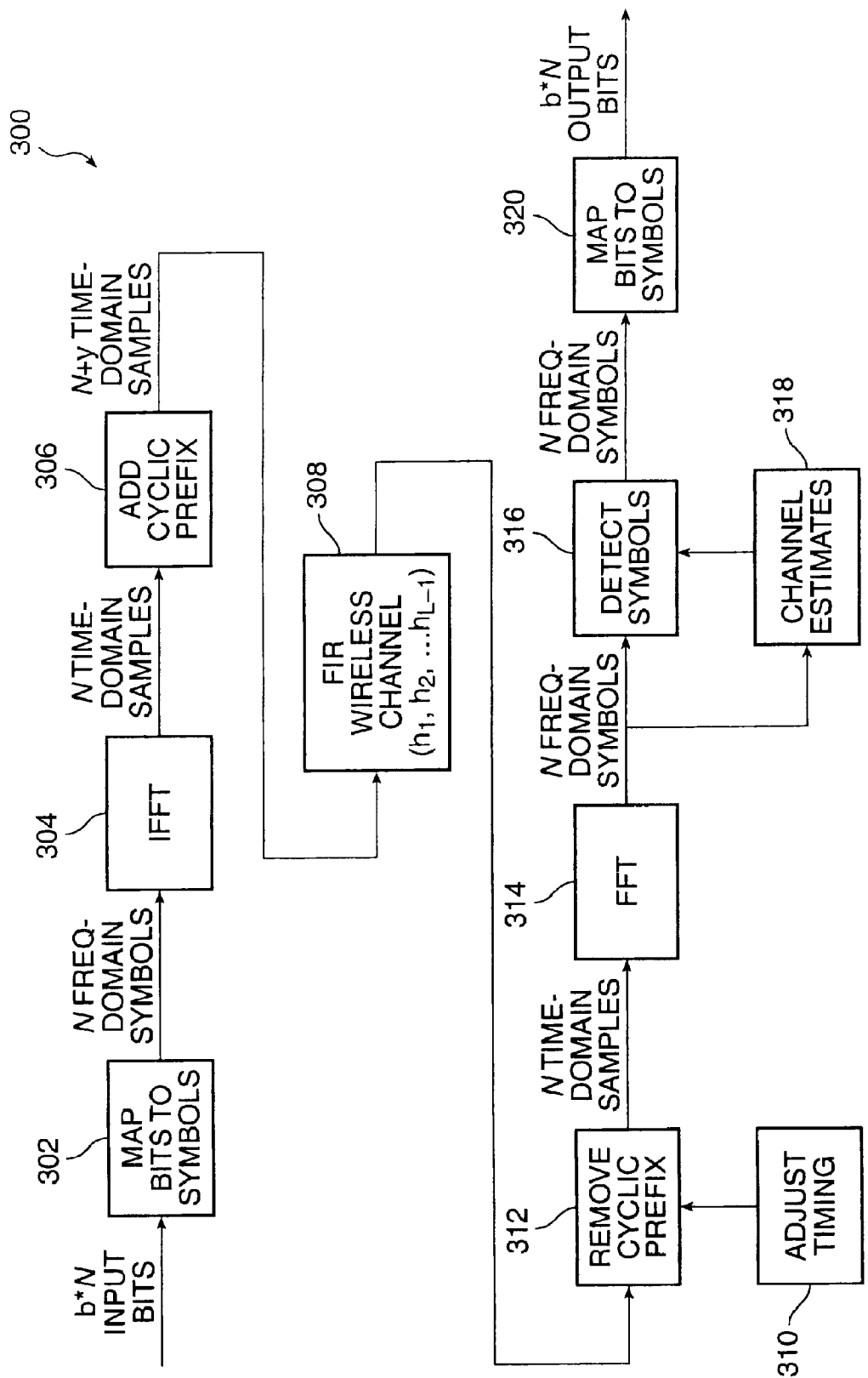
FIG. 3 depicts an OFDM communication system that may be operated in accordance with one embodiment of the present invention.

FIG. 3 depicts an OFDM communication system 300 that may be operated in accordance with one embodiment of the present invention. OFDM communication system 300 represents a combination of the transmitter side of the modem at a DCD and the receiver side of the modem at the AP, and the channel in between them. A comparable system operates on the downlink from the DCD to the AP.

A symbol mapper 302 maps data bits to M-ary QAM frequency-domain symbols, where $M=2^b$ and b is the number of bits per symbol. The QAM constellation used in the exemplary embodiment is 4-QAM in which each symbol represents 2 data bits. The number of symbols per OFDM burst is chosen to be $N=2^n$, where N=256 in the exemplary system. The N symbols are converted to a 256-point time-domain sequence through an inverse Fast Fourier Transform (IFFT) operation by an IFFT stage 304. A cyclic prefix application stage 306 copies the last v points in the time-domain sequence and affixes the copies to the beginning of the sequence, increasing the length of the time-domain sequence to 256+v points. This operation is known as the addition of a "cyclic prefix." The motivation for employing a cyclic prefix is discussed below.

The complex digital time-domain sequence is converted to in-phase (I) and quadrature (Q) analog signals that are used to quadrature-modulate an RF carrier. The RF carrier is then radiated from a transmitter antenna. At the receiver, the signal is captured by another antenna and downconverted into I and Q baseband analog waveforms, that are then converted to digital representations with analog-to-digital converters. For simplicity, in this discussion we will consider an equivalent complex baseband channel 308 modeled as a finite impulse response (FIR) system. Adopting the baseband system model greatly simplifies the discussion. With this model, the output of the channel is given by the convolution of the complex time-domain samples with the channel impulse response, h. The length of the baseband channel is limited to L symbols, and the FIR channel is described by the channel coefficients $\{h_0, h_1, \ldots, h_{L-1}\}$. The channel length corresponds to the time span over which the multipath energy arrives at the receiver due to an impulse being transmitted by the transmitter.

The receiver captures the output of the channel. A separate timing adjustment circuit 310 is used to determine the first sample of each incoming burst. The cyclic prefix is removed by a cyclic prefix removal stage 312, and the remaining time-domain samples are fed into a 256-point FFT stage 314 that produces a 256-point received frequency spectrum. Given knowledge of the frequency-domain channel response H(f), each point in the received frequency-domain sequence can be corrected for the channel's amplitude scaling and phase shift at that frequency by a symbol detection stage 316. A channel estimation circuit 318 uses known training tones that are embedded in each burst to recover the complex scalars (one for each of the 256 frequency bins) describing the channel frequency response. A discussion of channel estimation methods is found in the cross-referenced SPATIO-TEMPORAL PROCESSING FOR COMMUNICATION application. Once the received frequency-domain data is corrected for the channel response, the constellation point closest to each sample is determined by symbol detection stage 316. Finally, using the same bits-to-symbol mapping as the transmitter, the output bits are produced by a bit mapper 320. It is understood that coding may also be employed in OFDM communication system 300.

The purpose of the cyclic prefix is to "orthogonalize" the channel. That is, it prevents energy from any frequency-domain symbol from interfering with any other frequency-domain symbol, even in frequency-selective channels as described in A. Peled and A. Ruiz, "Frequency domain data transmission using reduced computational complexity algorithms," IEEE Int. Conf. Acoust., Speech, Signal Processing, Denver, Colo., April 1980, pp. 964-967, the contents of which are herein incorporated by reference. In order for the orthogonalization to hold, the length of the cyclic prefix must equal or exceed the length of the channel, $v \geq L$. The channel length is a function of the operating environment, with indoor channels typically being much shorter than outdoor channels. For example, in an office environment the duration of the impulse response is typically less than 2 microseconds. In large outdoor wireless systems, channels can reach lengths of 25 microseconds or more.

Once again considering the office environment, assuming that the sample rate of the OFDM system is 10 MHz, then the length of the channel is 20 samples. The requirement stated above regarding the minimum length of the cyclic prefix assumes perfect synchronization of the incoming signal. If any timing uncertainty exists, as it does with any practical system, the length of the cyclic prefix can be increased to account for the maximum timing error. Assume that the timing error is ±3 samples. Then the length of the cyclic prefix must be $\geq 26$ samples.

The maximum number of data bits per transmission is given by $b \cdot N=512$. The actual number will be lower because a number of the N frequency-domain symbols are reserved for channel training tones. Many MAC protocols for wired systems use short transmissions for bus monitoring and control. In a wireless network one might also desire the ability to send brief transmissions for monitoring and control while maintaining the ability to transmit longer bursts for data. A scheme such as this tends to optimize efficient use of the bus resource. Of course when sending fewer data bits per burst, a corresponding shorter duration transmission is expected. In an OFDM system, this is inconvenient since sending shorter and longer bursts requires both the transmitter and receiver to implement (I) FFTs of different lengths. The present invention provides a system and method for sending brief messages in an efficient manner and one which does not require more than a single-length (I) FFT implementation.

Top Level MAC Protocol and Apparatus

Figure 4A:
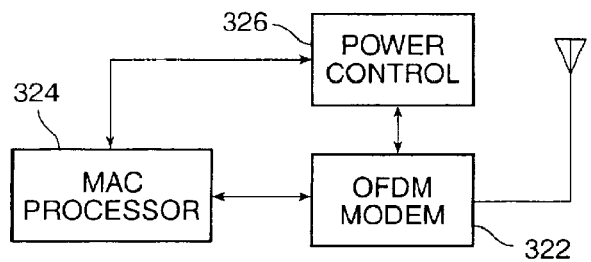
FIG. 4A depicts portions of a data communication device or central access point according to one embodiment of the present invention.

FIG. 4A depicts portions of a data communication device or central access point according to one embodiment of the present invention. An OFDM modem 322 includes the transmitter and receiver circuitry discussed with reference to FIG. 3. A MAC processor 324 is responsible for implementing a MAC protocol as will be described. The operation of MAC processor 324 will of course depend on whether it is incorporated within a DCD 202 or within AP 204. MAC processor 324 exchanges protocol-related information with OFDM modem 322. A power control processor 326, typically incorporated only within DCD 202, turns off portions of DCD 202 when no access to the wireless medium is scheduled as determined by the operation of MAC processor 324.

Preferably, central AP 204 controls usage of the network medium. By requiring DCDs 202 to synchronize to AP 204 prior to transmitting any signals, the hidden terminal problem is eliminated.

Figure 4B:
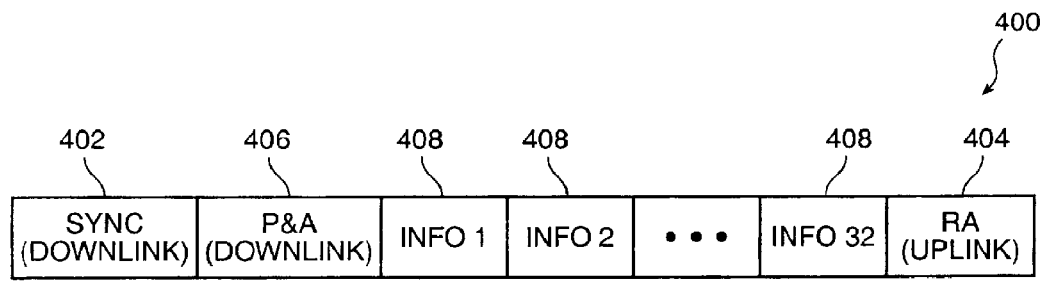
FIG. 4B depicts an air interface frame according to one embodiment of the present invention.

A top level schedule for use of the medium by DCDs 202 and AP 204 is defined by a MAC protocol data structure referred to as an Air Interface Frame. FIG. 4B depicts an AIF 400 according to one embodiment of the present invention. AP 204 transmits a predetermined waveform during a Synchronization (SYNC) burst 402. Each DCD 202 uses SYNC burst 402 for frequency and timing acquisition. SYNC burst 402 is a physical layer burst.

A Permission and Acknowledgement (P&A) burst 406 follows SYNC burst 402. After P&A burst 406, there are 32 INFO bursts 408 carrying data. The function of P&A burst 406 is twofold: to acknowledge which access requests were received in a previous RA burst 404, and to broadcast the assignment of each INFO burst 408 within the current frame 400. P&A burst 406 is a MAC layer burst while INFO bursts 408 are physical layer bursts.

During Request Access (RA) burst 404, any of DCDs 202 needing to use the bus may transmit an access request. Since DCDs 202 submit access requests without coordination, the possibility of collisions exists within RA burst 404. The present invention provides multiple channels for simultaneous access requests during RA burst 404. This reduces the probability of collisions and makes more access request opportunities available without reducing efficiency. RA burst 404 is a MAC layer burst.

When a DCD 202 initially contacts AP 204, AP 204 responds with a timing adjustment command. This is required because, even though DCD 202 has synchronized itself to the AP 204's transmissions, range uncertainty can cause messages transmitted by different DCDs to overlap upon arrival at AP 204. It is advantageous to set aside initial access intervals in which poorly aligned transmissions from DCDs 202 that haven't yet adjusted their timing do not interfere with other messages on the bus. Additional guard time can be used in conjunction with selected RA bursts 404 to accommodate the range uncertainty associated with DCDs 202 initially accessing the network. The approach described herein results in increased efficiency because the parallel RA channels all share the added guard time. In a conventional system, additional guard time is required for each RA channel.

After RA burst 404, AP 204 transmits by communicating the usage of INFO bursts 408 within the frame in advance, those DCDs 202 not scheduled to transmit or receive during the frame may disable unused circuitry until the next SYNC burst 402. Disabling idle circuits is a valuable strategy to extend battery life in portable DCDs 202.

This MAC protocol is designed to operate over a single bi-directional bus the usage of which is divided into multiple bursts. Unlike many wireless MAC protocols, the MAC protocol described herein does not typically require that information emanating from AP 204 be transmitted in one portion of the spectrum, and information flowing into AP 204 be transmitted in another portion of the spectrum. This results in AP 204 being able to allocate usage of the medium such that the bus utilization remains high even when the AP traffic is asymmetrical (with respect to the AP).

Thus, AIF 400 includes 35 bursts. Of the 35 bursts, one burst is dedicated to physical layer functions, 32 bursts are dedicated to data link layer functions, and two bursts are dedicated to MAC layer functions. The 32 Information (INFO) bursts 408 may be transmitted by either AP 204 or a particular DCD 202 and carry primarily payload. Usage of INFO bursts 408 is controlled by AP 204 in response to varying traffic loads on the bus.

In RA burst 404, P&A burst 406, and INFO bursts 408, a certain number of symbols are reserved for training and carry no payload data. For channel estimation, the number of symbols used for training should equal or exceed the length of the longest channel in which the system is expected to operate. In a preferred embodiment, 32 frequency-domain symbols are set aside for training, leaving 224 frequency domain symbols (448 bits) to carry information in each burst. The 448 bits in MAC-layer and INFO bursts are divided amongst several fields.

Internal Burst Structure

Figure 5:
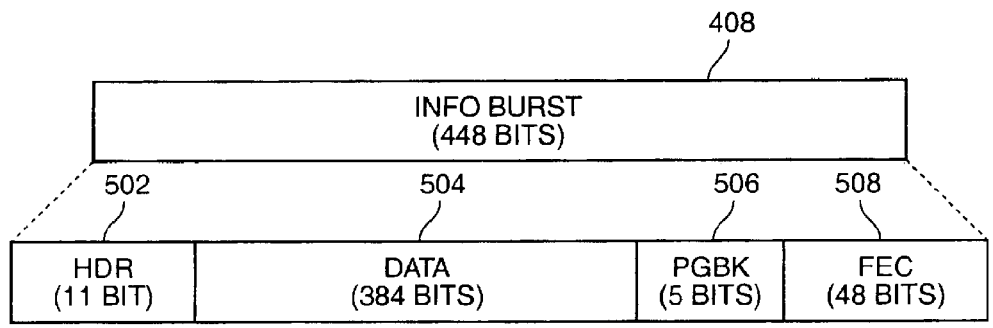
FIG. 5 depicts an information burst according to one embodiment of the present invention.

FIG. 5 depicts an INFO burst 408 according to one embodiment of the present invention. INFO burst 408 includes 4 major fields: HDR 502, Data 504, PGBK 506, and FEC 508. The 11-bit HDR (header) field 502 carries data link layer information including the message type and message sequencing information. The 384-bit Data field 504 carries user payload. The 5-bit PGBK field 506 is used to implement the MAC-layer Piggyback function. With this field, a DCD 202 informs AP 204 whether or not it has additional data to transmit. DCD 202 writes the number of additional bursts it needs (from 1 to 31, in binary representation) in PGBK field 506. DCD 202 writes 5 zeros into PGBK field 506 to tell AP 204 that it has no pending data to send once the current transmission is finished. The last field in INFO burst 408 is FEC (forward error correction) field 508. The 6-byte FEC field 508 carries redundant information derived from the other 50 bytes in the burst. The redundant information is exploited to correct data errors when they occur in transmission. The FEC coding employed could be any one of several techniques, however a byte-based Reed-Solomon code is a very efficient error-correction technique for a 448-bit codeword. In the exemplary embodiment, 6-byte FEC field 508 allows up to 3 incorrectly received bytes within the burst to be corrected.

Figure 6:
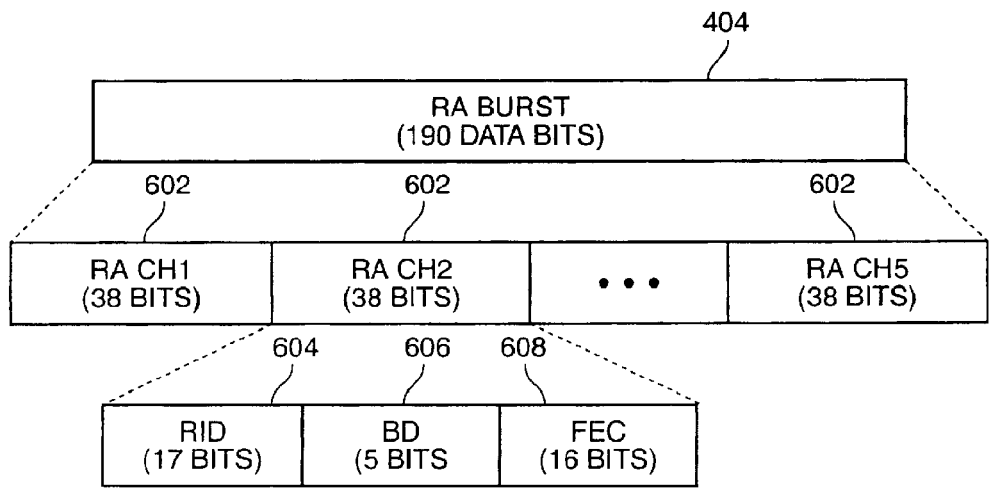
FIG. 6 depicts an access request burst according to one embodiment of the present invention.

FIG. 6 depicts RA burst 404 according to one embodiment of the present invention. RA burst 404 contains 190 bits that are divided into 5 identical fields 602. In this exemplary embodiment, up to 5 DCDs 202 can submit 38-bit access request messages during RA burst 404. Each of the parallel access request opportunities within a burst is referred to as an "RA channel." The unique design of RA burst 404 enables simultaneous access attempts to be heard by AP 204 thereby reducing contention among network DCDs 202. Furthermore, the design allows a burst large enough to carry data to be used for bus control functions without sacrificing efficiency and preserving the use of a single-length (I) FFT throughout the system.

In an OFDM system, the tones within a burst are substantially independent from one another, i.e., no inter-carrier interference is produced. This property is exploited to create the parallel RA channels within the RA burst. This is accomplished by dividing the burst's tones into 5 mutually exclusive subsets. Each subset of tones constitutes one RA channel. Those tones that are not assigned to a given RA channel are not energized by the DCD using that particular RA channel. That is, a frequency-domain symbol of zero magnitude is transmitted on those tones belonging to all other RA channels.

Figure 7:
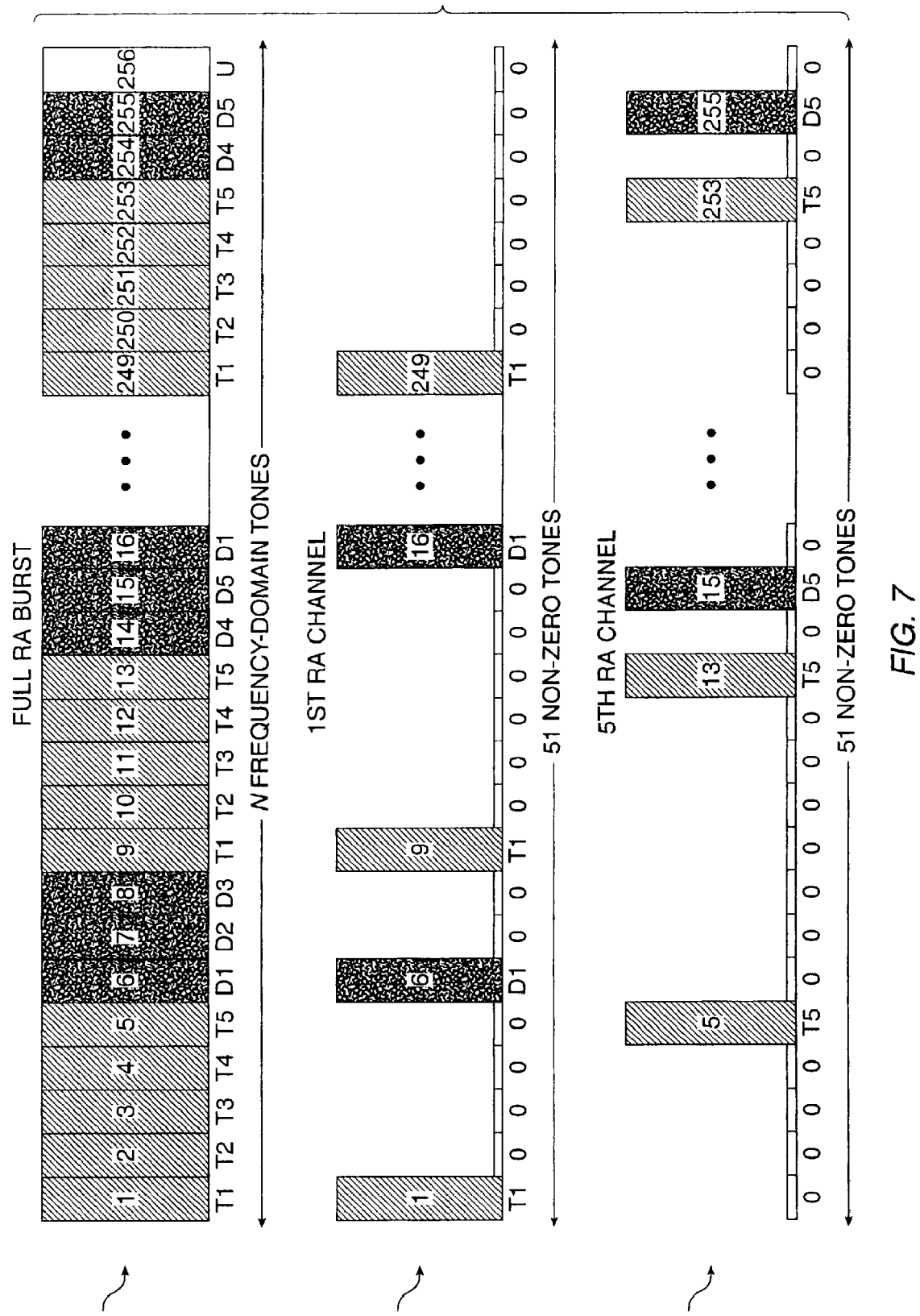
FIG. 7 depicts further details of an access request burst according to one embodiment of the present invention.

FIG. 7 depicts the division of the tones of RA burst 404 into the five channels 602. The tones associated with each RA channel 602 are made up of data tones ($D_i$) and training tones ($T_i$), where i denotes the RA channel number. Tones with zero energy are labeled with "0". For simplicity, only the first and fifth RA channels are shown.

While the data tones may be grouped in virtually any manner deemed convenient, for best performance the training tones should span the OFDM burst and be spaced at constant intervals if the minimum number of training tones is to be used. FIG. 7 assumes that 32 tones are required to characterize the channel. The $i^{th}$ RA channel uses tones n=i+8k, k=0, 1, ..., 31, for training. The available data tones are assigned to the 5 RA channels in sequential fashion. Note that because the 256 tones in the RA burst do not divide equally into the 5 RA channels 602, tone number 256 is unused. Each RA channel 602 includes 19 data tones that carry information with 2 bits per tone. This configuration results in a 38-bit RA channel.

With this approach, 5 DCDs 202 each using a different RA channel 602 can transmit simultaneously during the RA burst without interfering with one another. The AP processes the RA burst in the usual fashion up through FFT stage 314. Then the frequency domain tones are separated into the 5 sets of tones corresponding to the 5 RA channels. Using the $i^{th}$ set of training tones ($T_i$), the channel response vector h that corresponds to the $i^{th}$ RA channel is estimated separately. The channel response estimate for the $i^{th}$ channel is applied to the set of RA channel data tones ($D_i$) to recover the data bits that were sent on the $i^{th}$ RA channel. This process is repeated for i=1, 2, ..., 5.

This burst sharing technique is thus applicable to time-varying channels such as wireless channels because the training tones are distributed through each access request burst. Since access requests are generated randomly by the DCDs, the most efficient way to perform the channel training is to embed training tones in each RA channel as has been described herein.

Referring once again to FIG. 6, observe that each of RA channel fields 602 is divided up into 3 sub-fields: an RID sub-field 604, a BD sub-field 606, and an FEC sub-field 608. RID sub-field 604 is used by a DCD 202 to distinguish itself as the originator of the RA submission. Each DCD 202 fills this sub-field with an identification number when transmitting in an RA channel 602. In one possible embodiment, a network administrator configures each DCD 202 that will connect to the network by assigning each a unique 17-bit ID number. Using 17 bits allows for 131,072 unique ID numbers to be used in a network.

BD sub-field 606 is used by DCD 202 to indicate the number of bursts that it wishes to use. The 5-bit field can be used to specify the desired number of bursts from 1 to 32. For example, suppose a DCD 202 has 300 bytes of data in its transmit buffer. This amount of data spans 6.25 INFO burst data fields. So, when submitting its access, the DCD would fill BD sub-field 606 with 00111 (binary 7).

FEC sub-field 608 contains redundant information based upon tRID and BD sub-fields 604 and 606. It is used to correct bit errors that may occur in transmission. With the small number of bits in each RA channel a bit-based cyclic redundancy check (CRC) coding scheme is appropriate, though other coding schemes could also be used. RA channels 602 are designed to contain a large amount of FEC redundancy to ensure robust operation of MAC layer functions.

Figure 8:
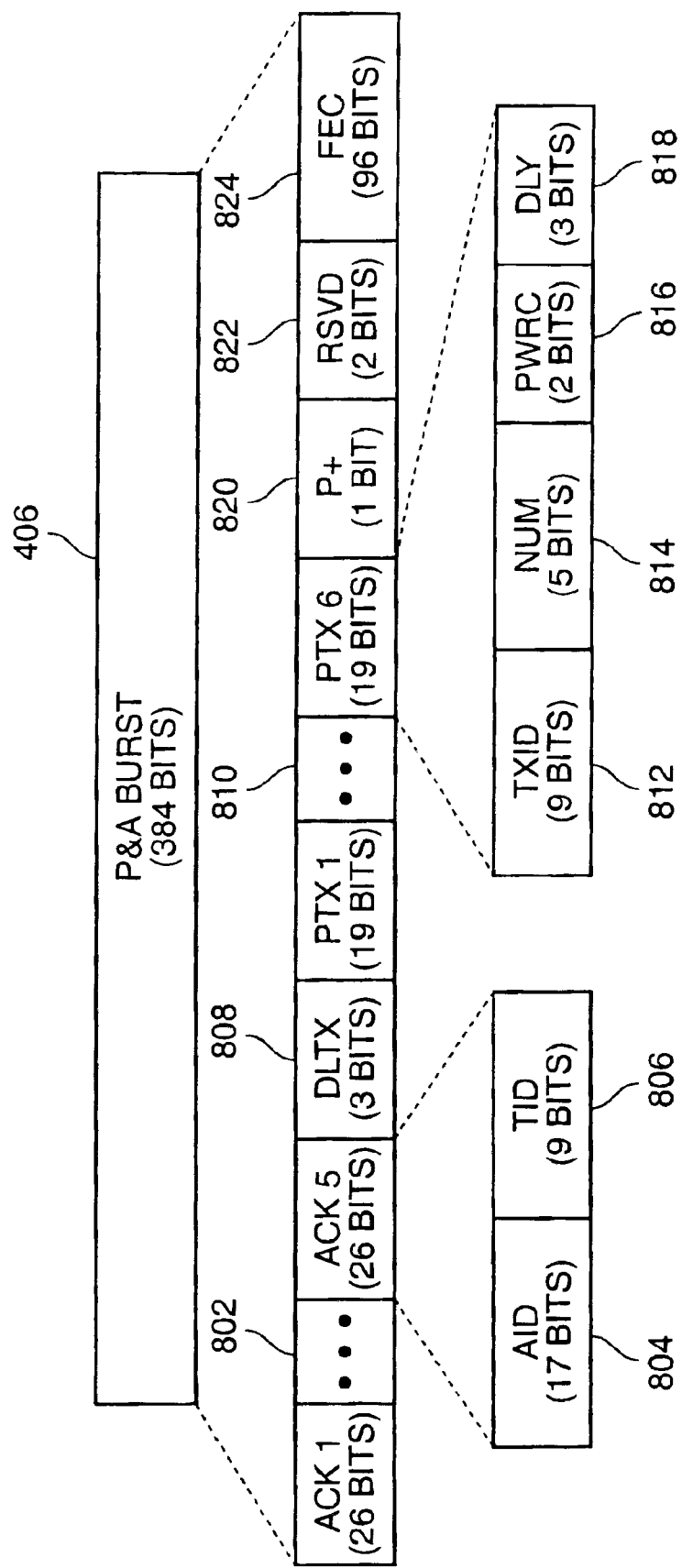
FIG. 8 depicts a permissions and acknowledgments burst according to one embodiment of the present invention.

FIG. 8 depicts P & A burst 406 according to one embodiment of the present invention. Preferably, only AP 204 is permitted to transmit during P&A burst 406 and its function is twofold. AP 204 uses this burst to acknowledge access requests received successfully during previous RA burst 404. In addition, AP 204 assigns the usage of INFO bursts 408 during the present air interface frame 400.

The first five fields 802 of P&A burst 406, ACK 1 through ACK 5, are used to acknowledge the reception of access requests from DCDs 202 which were received during previous RA burst 404. The ACK fields 802 each contain two sub-fields. The DCD's ID number (that which the DCD entered into RID field 604 of RA channel 602) is placed into a 17-bit AID sub-field 804. A DCD 202 awaiting acknowledgment of an access request monitors AID sub-fields 804 in P&A burst 406 looking for an entry that matches its own ID number. Reception of an ACK field 802 with a matching ID sub-field 804 serves as a positive acknowledgment of the DCD's access request. A TID sub-field 806 is used to carry a 9-bit temporary identification (TID) number. This number is used by one DCD 202 for the duration of an access event in which it is involved. An access event is defined to be the time from which an RA is successfully received to the time when a DCD 202 has finished sending its last burst. The last burst is sent after any piggyback requests are submitted and cleared, which can result in relatively long access events. The 9-bit TID sub-field 806 allows up to 512 access events to exist simultaneously. When a DCD 202 receives an RA acknowledgment, it records the number given in TID sub-field 806 and stores it for use throughout the duration of the access event.

The ACK fields 802 are followed by a downlink transmissions (DLTX) field 808 and eight permission-to-transmit (PTX) fields 810. The 3-bit DLTX field 808 designates the number of PTX fields 810 that correspond to downlink transmissions, beginning with PTX1. For example, if the contents of DLTX are [011], then PTX1, PTX2, and PTX3 refer to downlink transmissions while PTX4, PTX5, PTX6, PTX7, and PTX8 refer to uplink transmissions. Each PTX field 810 includes 4 sub-fields: TXID 812, NUM 814, PWRC 816, and DLY 818. TXID sub-field 812 specifies the DCD 202 involved in a given burst. The TXID number in PTX field 810 must therefore match the TID number supplied to the DCD 202 in a prior ACK field 802. If the PTX field 810 is one of the first n (where n is the number inserted into DLTX field 808) within P&A burst 406, then TXID sub-field 812 specifies the DCD 202 scheduled to receive a downlink transmission. If the PTX field 810 is not one of the first n, then the TXID sub-field 812 specifies the DCD 202 that is to transmit an uplink message. NUM field 814 specifies the number of consecutive INFO bursts 408 to be received (or transmitted) by DCD 202 specified in TXID sub-field 812. In order to illustrate the function of P&A burst 406, consider the example given in Table 1 and Table 2. The values in the pertinent fields in an exemplary P&A burst 406 are given in Table 1. The corresponding usage of the frames INFO bursts is given in Table 2.

TABLE 1

SELECTED FIELD ENTRIES FROM AN EXEMPLARY P&A BURST.

| Field | (Sub-Field), Value | (Sub-Field), Value |
| --- | --- | --- |
| DLTX | 3 | |
| PTX 1 | TXID, 4 | NUM, 2 |
| PTX 2 | TXID, 473 | NUM, 10 |
| PTX 3 | TXID, 85 | NUM, 3 |
| PTX 4 | TXID, 62 | NUM, 5 |
| PTX 5 | TXID, 4 | NUM, 12 |
| PTX 6 | TXID, 0 | NUM, 0 |
| PTX 7 | TXID, 0 | NUM, 0 |
| PTX 8 | TXID, 0 | NUM, 0 |

TABLE 2

CORRESPONDING INFO BURST USAGE.

| INFO Burst Number | DCD TID Number | DCD State |
| --- | --- | --- |
| 1, 2 | 4 | Receiving |
| 3-12 | 473 | Receiving |
| 13-15 | 85 | Receiving |
| 16-20 | 62 | Transmitting |
| 21-32 | 4 | Transmitting |

The design of P&A burst 406 permits a DCD 202 to determine precisely whether it will be involved in the exchange of each INFO burst 408 in AIF 400. PWRC sub-field 816 is used to facilitate power control. This 2-bit sub-field 816 is used to instruct the DCD 202 specified in the ID sub-field to increment, decrement, or leave unchanged its RF output power. Likewise, DLY sub-field 818 is used to instruct the DCD to advance, retard, or leave unchanged, the timing of its burst transmissions.

If eight PTX fields 810 are not sufficient to schedule all 32 bursts in AIF 400, then a P+ bit 820 is asserted. This indicates that a second P&A burst 406 immediately follows the usual P&A burst, thereby supplanting the first INFO burst 408. A 2-bit RSVD field 822 that is reserved for future use follows the P+ field. A last field (FEC) 824 contains 96 forward error correction bits. A large number of FEC bits are included in P&A burst 406 to help ensure the integrity of the MAC layer operations which are critical to robust system operation.

The structure of P&A burst 406 enables implementation of a "sleep mode" feature. After receiving and decoding P&A burst(s) 406, each DCD 202 knows during which, if any, of INFO bursts 408 within AIF 400 it will be receiving or transmitting. For those bursts in which a DCD 202 will be inactive, power control processor 326 powers down the circuitry involved in burst reception and transmission. Power control processor 326 continues keeping time and reactivates the unit for reception of the next frame's SYNC and P&A bursts 402 and 406. While certain circuits, such as interface and clock circuits must operate continually, the sleep mode feature can substantially reduce the DCD's power consumption.

Figure 9:
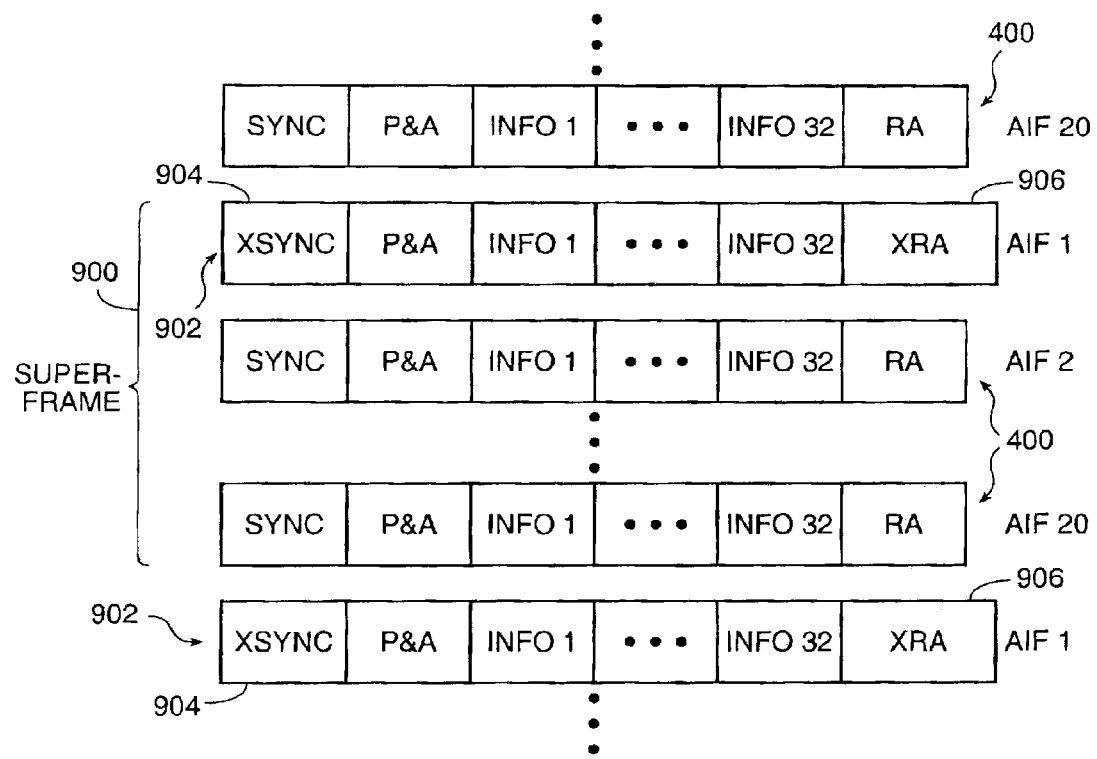
FIG. 9 depicts a superframe including multiple air interface frames according to one embodiment of the present invention.

FIG. 9 depicts a modified frame structure to accommodate DCDs 202 with a large amount of timing uncertainty according to one embodiment of the present invention. The large timing uncertainty will generally be associated with DCDs 202 that are contacting the AP for the first time in a session. In all subsequent transmissions the DCDs 202 will adjust their timing with high accuracy in response to a command from AP 204. Therefore, a superframe structure is used to accommodate these initial accesses by DCDs 202. A superframe 900 includes a predetermined number (20 in the example) of AIFs, with a special first AIF 902 in superframe 900 having special characteristics. The receiver of DCD 202 can determine the position of first frame 902 within superframe 900 by searching for a unique marker within that frame's first burst, an XSYNC burst as described below.

The special first AIF 902 in the superframe includes the unique bursts XSYNC 904 and XRA 906 that replace the SYNC burst and RA burst. XSYNC burst 904 is a modified version of the previously described SYNC burst. It still permits the DCD to obtain frequency offset correction and burst timing, yet it is constructed so that it can be uniquely identified as the XSYNC burst. XRA burst 906 is like the regular RA burst, but with additional cyclic prefix samples, additional training tones, and a small guard time interval. The XRA burst's modified structure allows the system to ascertain the time of arrival of each parallel unsynchronized access request, but prevents these access requests from overlapping the next burst in the superframe. XRA burst 906 remains compatible with the system's 256-point I(FFT) convention.

Recall that previously it was assumed that the DCD transmit timing uncertainty was insignificant; either the distance between DCDs and the AP was sufficiently small, or the DCD adjusted the timing of its transmissions per instructions from the AP. Now suppose that 500 meters separate the AP and the farthest DCD. If the DCD has not previously contacted the AP, then it has not yet received a timing adjustment command. Thus if the DCD were to submit an access request during a regular RA burst according to the timing it perceives, its transmission would arrive at the AP roughly 3.2 microseconds too late in the frame structure. In an exemplary embodiment of the XRA slot, we consider a construction that allows for roundtrip time delays, and therefore burst misalignments of up to 3.2 microseconds. In the exemplary system with the 10 MHz sample rate, this corresponds to 32 samples.

Figure 10:
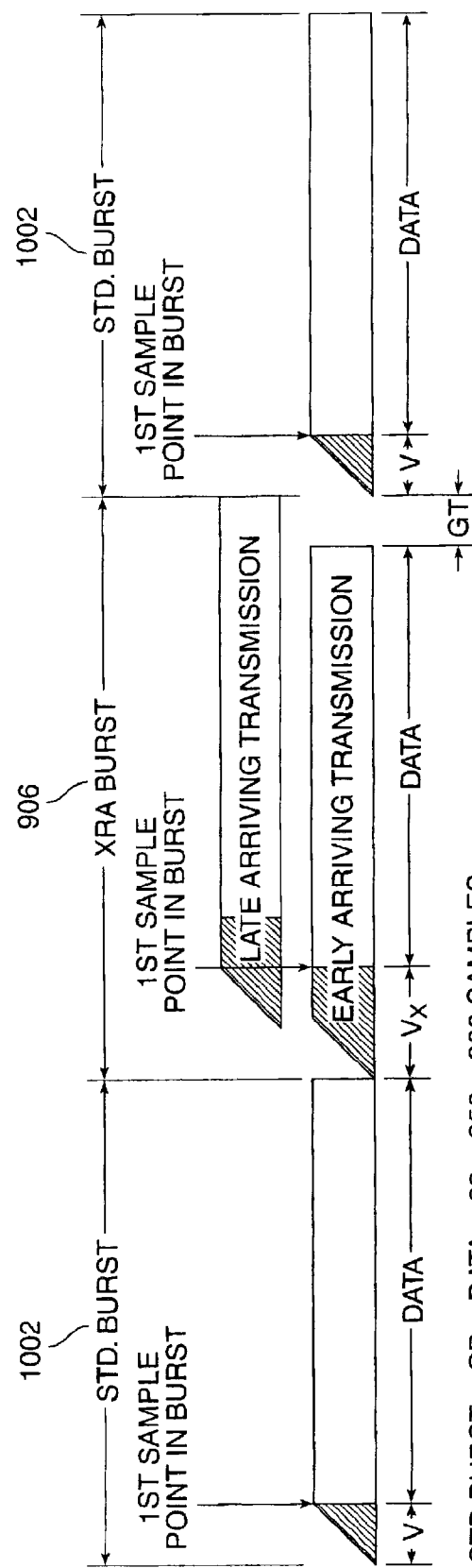
FIG. 10 depicts details of a special request access burst according to one embodiment of the present invention.

The timeslot of XRA burst 906 is sandwiched between the prior and subsequent bursts 1002 in FIG. 10. The 32 samples of timing misalignment effectively lengthen the channel to $L_X = L + 32 = 52$ samples. Recall that both the length of the cyclic prefix and the number of training tones should be greater than or equal to the length of the channel, i.e., $v_X \geq L_X$ and $N_{XT} \geq L_X$. In the example, $v_X = N_{XT} = 64$ samples is chosen. In addition, a guard time of at least 32 symbols must be included in the superframe timing to prevent late arriving XRA transmissions from overlapping the next burst.

Figure 11:
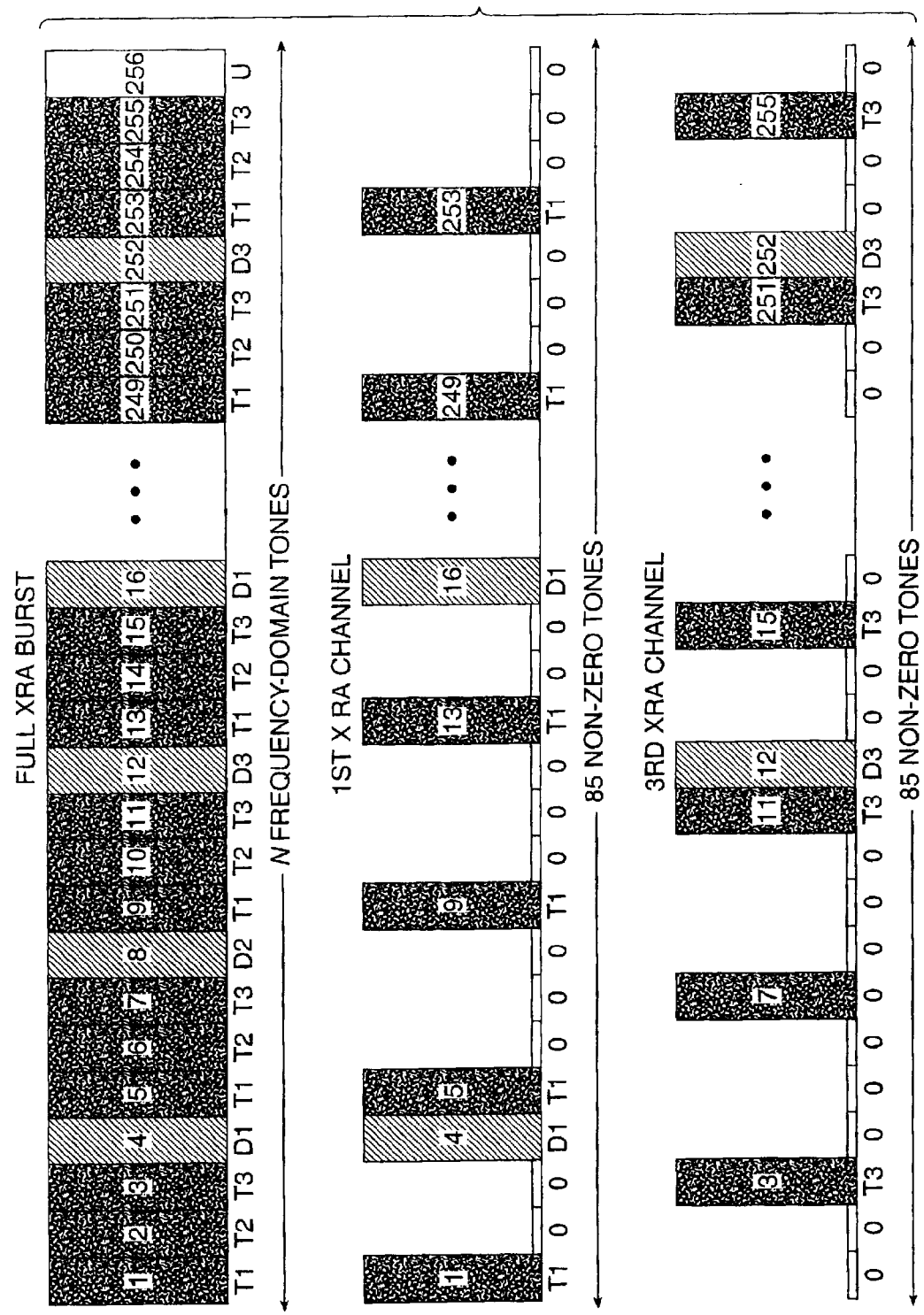
FIG. 11 depicts further details of a special request access burst according to one embodiment of the present invention.

With the increased number of required training tones for access attempts within XRA burst 906, the total number of tones may no longer be divided into 5 sets as in the regular RA burst. Instead XRA burst 906 allows three parallel XRA channels. Each of the channels includes 64 training tones and 21 data tones. However, to remain consistent with the regular RA channels, one may choose to use only 19 of the 21 data tones in each XRA channel. FIG. 11 depicts the arrangement of tones within XRA burst 906.

The advantage of this approach is that up to 3 DCDs making initial access request can transmit during the XRA burst and not interfere with one another nor with communications taking place in adjacent bursts. The slight overhead penalty of 64 samples per superframe enables up to 3 initial access attempts.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference.

We claim:

1. An apparatus comprising:
a modem configured to process according to orthogonal frequency division multiplex (OFDM) techniques baseband transmit signals for wireless transmission and baseband receive signals derived from received wireless signals; and
a medium access control (MAC) processor configured to connect to the modem, wherein the MAC processor is configured to process an access request contained in a transmission received from a particular communication device among a plurality of communication devices and recovered from the received transmission by the modem, wherein the MAC processor is configured to process the access request based on a subgroup of a plurality of OFDM tones contained in the access request which uniquely identifies the particular communication device that transmitted the access request.

2. The apparatus of claim 1, wherein the MAC processor is further configured to generate transmission schedule data based on the access request and to couple the transmit schedule data to the modem for transmission to at least the particular communication device.

3. The apparatus of claim 2, wherein the modem is configured to analyze the training data comprised of predefined values for OFDM tones.

4. The apparatus of claim 1, wherein the modem is further configured to extract training data contained in the access request and to determine an OFDM channel response with respect to the particular communication device based on the training data.

5. The apparatus of claim 1, wherein the modem is configured to process baseband transmit signals and baseband receive signals according to bursts of a fixed length, and further comprising a Fast Fourier Transform (FFT) module having a single-length implementation for baseband receive signal processing and an Inverse FFT module having a single-length implementation for baseband transmit signal processing.

6. The apparatus of claim 1, wherein the modem is configured to generate, in response to receiving an access request, a timing adjustment command for transmission to the particular communication device, wherein the timing adjustment command is configured to cause the particular communication device to adjust its timing so as to reduce interference with other messages transmitted by other communication devices.

7. The apparatus of claim 1, wherein the modem is configured to allocate a guard time interval associated with a plurality of potential access requests from the plurality of communication devices, wherein the guard time interval is configured to accommodate range uncertainty associated with the plurality of communication devices.

8. The apparatus of claim 1, wherein the MAC processor is configured to process multiple unsynchronized access requests each comprising cyclic prefix samples, training tones and a guard time interval transmitted from multiple communication devices and to ascertain a time of arrival of each simultaneously received unsynchronized access request without overlapping a next burst in a frame.

9. The apparatus of claim 8, wherein the MAC processor is configured to process each access request such that a length of the cyclic prefix samples and a number of the training tones is greater than or equal to a length in terms of number of symbols of a baseband channel.

10. The apparatus of claim 1, wherein the MAC processor is configured to process multiple access requests transmitted simultaneously from different communication devices and to distinguish the access requests from the different communication devices based on the subgroup of OFDM tones for each access request.

11. An apparatus comprising:
a modem configured to process according to orthogonal frequency division multiplex (OFDM) techniques baseband transmit signals for wireless transmission and baseband receive signals derived from received wireless signals; and
a medium access control (MAC) processor configured to connect to the modem, wherein the MAC processor is configured to generate an access request for transmission to a central access device associated with a wireless network, wherein the MAC processor is configured to generate the access request comprising a subgroup of a plurality of OFDM tones that uniquely identifies the apparatus that transmits the access request.

12. The apparatus of claim 11, wherein the modem is configured to include training data in the access request.

13. The apparatus of claim 11, wherein the modem is configured to process baseband transmit signals and baseband receive signals according to bursts of a fixed length, and further comprising a Fast Fourier Transform (FFT) module having a single-length implementation for baseband receive signal processing and an Inverse FFT module having a single-length implementation for baseband transmit signal processing.

14. The apparatus of claim 11, wherein the modem is configured to, in response to receiving a timing adjustment command from the central access device, adjust timing of transmissions made to the central access device.

15. The apparatus of claim 11, wherein the modem is configured to generate a frame contained in the access request, wherein the frame comprises a guard time interval configured to allow the central access device, upon receiving the frame, to determine the time of arrival of the frame, with respect to each of a plurality of unsynchronized access requests from other devices.

16. The apparatus of claim 15, wherein the modem is configured to generate the guard time interval of a duration sufficient to prevent overlap with a next scheduled access request.

17. The apparatus of claim 11, wherein the MAC processor is configured to generate the access request comprising prefix samples, training tones and a guard time interval that are configured to allow the central access device to ascertain a time of arrival of simultaneously received unsynchronized access requests from multiple devices without overlapping a next burst in a frame.

18. The apparatus of claim 17, wherein the MAC processor is configured to generate the access request such that a length of the cyclic prefix samples and a number of the training tones is greater than or equal to a length in terms of number of symbols of a baseband channel.

* * * * *